June 1, 1943.　　　M. A. BOLTON　　　2,320,845
BED PAN
Filed March 28, 1942　　　2 Sheets-Sheet 1
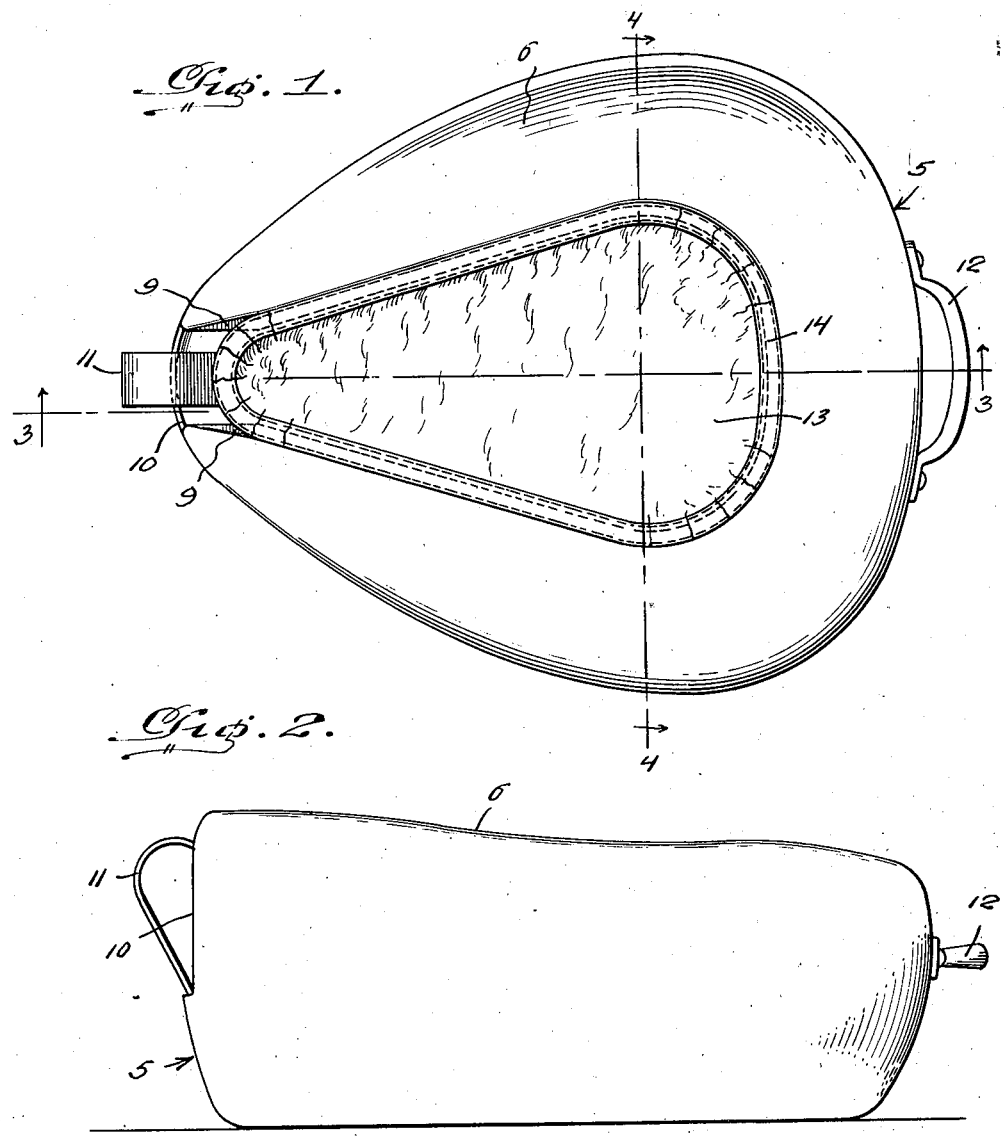
Inventor
Marion A. Bolton,
By J. Stanley Burch
Attorney

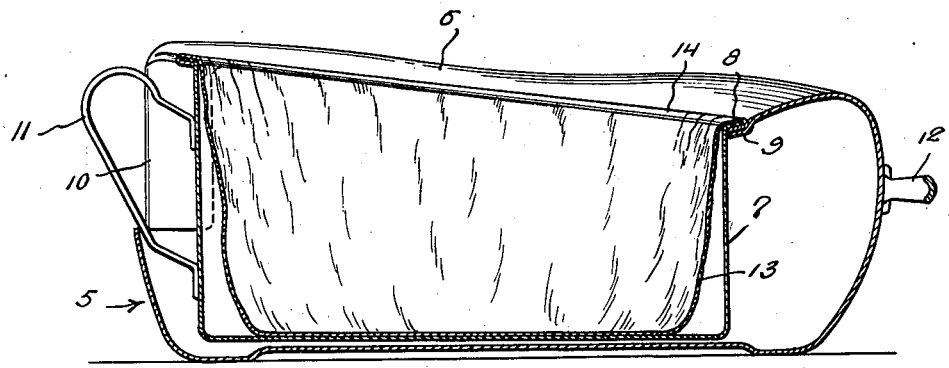
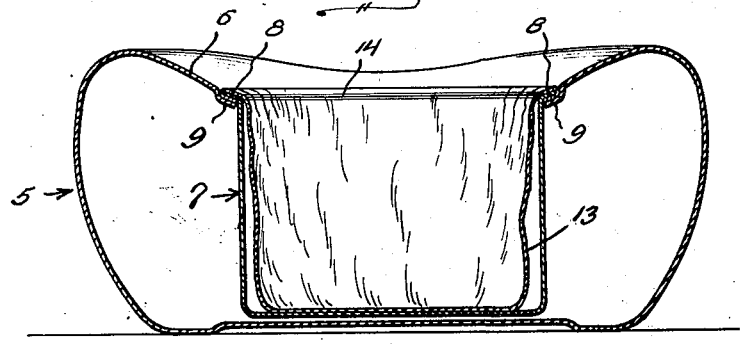
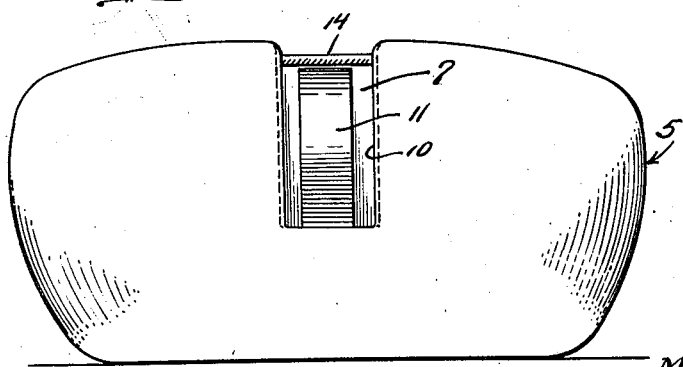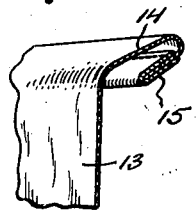
Marion A. Bolton,
By J. Stanley Burch
Attorney Patented June 1, 1943

2,320,845

UNITED STATES PATENT OFFICE 2,320,845

BEDPAN

Marion A. Bolton, Hancock, Mich.

Application March 28, 1942, Serial No. 436,667

1 Claim. (Cl. 4—112)

This invention relates to improvements in bed pans, and it consists in the novel form, combination and arrangement of parts hereinafter more fully described, shown in the accompanying drawings, and claimed.

An object of my invention is to provide a bed pan embodying a waterproof lining employed in such manner as to insure sanitation.

A more specific object of the present invention is to provide a bed pan including an outer pan member, an inner pan member removably supported thereby, and a removable waterproof lining for the inner pan member, whereby the inner pan member and its lining may be removed and carried to a desired point of disposal with facility and ease.

Another object of the invention is to provide the outer pan member with an inturned flange having a downwardly offset inner edge portion forming a seat, the inner pan member having an outturned top flange arranged to engage said seat, and the inner lining for the inner pan member being folded about the flange of the inner pan member and turned under the latter flange so as to be clamped between the flanges of the pan members and sustained in an orderly open condition.

Other objects and features of the invention will appear from the following description when considered in connection with the accompanying drawings, in which:

Figure 1 is a top plan view of a bed pan constructed in accordance with the present invention.

Figure 2 is a side elevational view thereof.

Figure 3 is a longitudinal vertical section taken on line 3—3 of Figure 1.

Figure 4 is a transverse section taken on line 4—4 of Figure 1.

Figure 5 is a front elevational view looking towards the right of Figure 2; and

Figure 6 is a fragmentary sectional perspective view showing the upper edge portion of the waterproof lining for the inner pan member.

Referring in detail to the drawings, the present bed pan consists of an outer pan member 5 having an inwardly turned flange 6 at its top which defines an elongated opening of the customary shape. The device further includes an inner pan member 7 provided at the top with an outturned flange 8. The inner edge portion of the flange 6 is downwardly offset as at 9 for a distance equal to the thickness of the flange 8 of inner pan member 7 and forms a seat for said flange 8 whereby, to sustain the inner pan member 7 suspended from the flange 6 within the pan member 5. At the narrow front portion of outer pan member 5, the latter is slotted through the upper portion of its side wall and through the flange 6 as at 10, and the front of the inner pan member 7 is equipped with a handle 11 that projects forwardly through this slot 10 and engages the bottom edge of the vertical portion of slot 10 to aid in sustaining the inner pan member when the latter is in place. Outer pan member 5 is provided at the rear with a handle 12 to facilitate slipping the bed pan under the patient.

Arranged within the inner pan member 7 is a removable waterproof lining 13 which may be made of any suitable impervious material, such as certain Cellophane, oiled silk, or the like that will readily immerse in water. This lining has an outturned upper edge portion 14 which terminates in a downwardly and inwardly turned portion 15. The portion 14 is adapted to extend over the top flange 8 of inner pan member 7, and the downwardly and inwardly turned portion 15 is adapted to extend around the edge of the flange 8 and under the latter flange so that it will be firmly clamped between the flange 8 and the seat 9 when the inner pan member is positioned for use as shown in Figure 4. Thus, the lining will be effectively sustained in an orderly open condition when in use, but the surface of flange 6 and the upper surface of portion 14 of the lining will be substantially flush so as to render pinching of the patient or user of the bed pan quite unlikely. It will be evident that the contents of the lining 13 together with the latter may be readily disposed of so as to keep the pan members 5 and 7 entirely clean at all times. Moreover, the lining will remain in position with respect to the inner pan member 7 when the latter is removed from the pan member 5, or when the lining and its contents are carried for disposal by means of the handle 11. This is a far better arrangement providing for greater safety and ease of handling than constructions involving merely an outer pan member and a waterproof lining not associated with any removable inner pan member.

What I claim as new is:

A bed pan comprising a substantially oblong outer pan member having an inwardly turned flange at its top provided with a downwardly offset inner edge portion, an inner pan member having an outturned flange at the top thereof adapted to rest upon the downwardly offset edge portion of the flange of the outer pan member so as to be sustained by the latter, and a waterproof lining for the inner pan member having an outwardly turned upper edge portion terminating in a downwardly and inwardly turned portion arranged to extend over and under the flange of the inner pan member and to be clamped between the latter flange and the downwardly offset edge portion of the flange of the outer pan member so as to be sustained in an orderly open condition when the bed pan is in use, said outer pan member having a slot at the upper front portion thereof and through the top flange thereof, and a handle on the front of the inner pan member extending outwardly through said slot.

MARION A. BOLTON.